United States Patent
Takizawa et al.

(10) Patent No.: US 7,561,622 B2
(45) Date of Patent: Jul. 14, 2009

(54) VIDEO ANALYZER AND VIDEO ERROR DETECTOR

(75) Inventors: Naruo Takizawa, Tokyo (JP); Hiroyuki Konno, Tokyo (JP); Takahiro Hamada, Tokyo (JP); Atsuro Ichigaya, Tokyo (JP); Eisuke Nakasu, Tokyo (JP)

(73) Assignees: K-Will Japan, Tokyo (JP); Japan Broadcasting Corporation, Tokyo (JP)

( * ) Notice: Subject to any disclaimer, the term of this patent is extended or adjusted under 35 U.S.C. 154(b) by 1072 days.

(21) Appl. No.: 10/505,067

(22) PCT Filed: Feb. 4, 2004

(86) PCT No.: PCT/JP2004/001096

§ 371 (c)(1),
(2), (4) Date: Aug. 18, 2004

(87) PCT Pub. No.: WO2005/043915

PCT Pub. Date: May 12, 2005

(65) Prior Publication Data

US 2005/0168590 A1 Aug. 4, 2005

(30) Foreign Application Priority Data

Oct. 31, 2003 (JP) ............................. 2003-371459

(51) Int. Cl.
*H04N 7/12* (2006.01)

(52) U.S. Cl. .................................. 375/240.27; 348/409

(58) Field of Classification Search ............... 348/222.1, 348/419, 699, 47, 426, 398, 405, 394, 415, 348/400, 401, 402, 392, 467, 468, 466, 464, 348/463, 397, 384, 390; 382/236, 239, 232; 386/68, 81; 375/240.23, 240.27, 240.24, 375/240.26, 240.03, 240.12, 242, 240.25
See application file for complete search history.

(56) References Cited

U.S. PATENT DOCUMENTS

| | | | | |
|---|---|---|---|---|
| 5,301,032 A | * | 4/1994 | Hong et al. | ................. 382/250 |
| 5,543,931 A | * | 8/1996 | Lee et al. | ...................... 386/68 |
| 6,125,147 A | * | 9/2000 | Florencio et al. | ....... 375/240.29 |
| 6,560,282 B2 | * | 5/2003 | Tahara et al. | ........... 375/240.02 |
| 2002/0168012 A1 | * | 11/2002 | Ramaswamy | .......... 375/240.29 |

FOREIGN PATENT DOCUMENTS

EP 0 869 684 A2 10/1998

(Continued)

OTHER PUBLICATIONS

International Search Report issued in PCT/JP2004/001096, mailed May 25, 2004, 5 pages.

(Continued)

*Primary Examiner*—Behrooz Senfi
(74) *Attorney, Agent, or Firm*—Osha • Liang LLP

(57) ABSTRACT

Since a delaying part (14) delays transmission of a video signal, the timing at which a decoded video signal is input into a multiplex processing part (16) matches the timing at which an analysis result from an encoded information analyzing part 13 is received by the multiplex processing part (16). It is, therefore, possible to perform processing for showing the quality level of a video on the same screen, and thus a large capacity memory is unnecessary.

11 Claims, 4 Drawing Sheets

FOREIGN PATENT DOCUMENTS

| | | |
|---|---|---|
| JP | 1-309598 | 12/1989 |
| JP | 5-328135 | 12/1993 |
| JP | 6-311052 | 11/1994 |
| JP | 9-294282 | 11/1997 |
| JP | 10-285594 | 10/1998 |
| JP | 11-187393 | 7/1999 |
| JP | 2000-23167 | 1/2000 |
| JP | 2002-325254 | 11/2002 |
| JP | 2003-111105 | 4/2003 |

OTHER PUBLICATIONS

English Abstract for JP-2000-023167 published Jan. 21, 2000, 1 page.

English Abstract for JP-9-294282 published Nov. 11, 1997, 1 page.

English Abstract for JP-11-187393 published Jul. 9, 1999, 1 page.

English Abstract for JP-5-328135 published Dec. 10, 1993, 1 page.

English Abstract for JP-10-285594 published Oct. 23, 1998, 1 page.

English Abstract for JP-6-311052 published Nov. 4, 1994, 1 page.

English Abstract for JP-1-309598 published Dec. 13, 1989, 1 page.

English Abstract for JP-2002-325254 published Nov. 8, 2002, 1 page.

English Abstract for JP-2003-111105 published Apr. 11, 2003, 1 page.

* cited by examiner

US 7,561,622 B2

VIDEO ANALYZER AND VIDEO ERROR DETECTOR

CROSS-REFERENCE TO RELATED APPLICATIONS

This application is a §371 of PCT/JP2004/001096 filed Feb. 4, 2004, which claims priority to JP 2003-371459 filed Oct. 31, 2003.

TECHNICAL FIELD

The present invention relates to an apparatus for decoding an encoded video signal and multiplexing information, and to a video analyzer suitable for delaying an encoded video signal. Also, the present invention relate to a video error detector suitable for detecting a video error from an encoded video signal.

BACKGROUND ART

In recent years, improvements in video processing techniques have made it possible to transmit high-quality videos, for example, high-definition television. Here, digital video signals in accordance with high-definition television broadcasting are transmitted to individual homes through wireless or wired transmission means. However, since the transmission capacity of each transmission means is limited, digital video signals having a large amount of data are often compressed and then transmitted. For compression techniques, conforming to MPEG (Moving Picture Experts Group) are known.

However, when a compressed digital video, which has been transmitted, is received and decompressed at a receiving side, sometimes the video has a problem in quality. Accordingly, in order to check such video quality, checking techniques have been developed (Refer to Japanese Unexamined Patent Application Publication No. 10-285594).

In the known technique described above, a video and its analysis result are displayed separately. If a video and its analysis result are multiplexed and displayed on one screen, the observer can grasp the characteristic of the video at a glance while viewing the video which is being played back in real time. However, when analyzing a transmitted digital video signal in real time, there is a problem in that the signals cannot be multiplexed in real time due to the time difference between the decoded video signals and analysis results, because the digital video signal is being transmitted while the analysis is performed. In order to solve this problem, the multiplexing of the signals by separately providing a memory for buffering the decompressed digital video signal and the reading of the memory in synchronization with the end of the analysis can be considered. However, this is not a realistic solution since a vast capacity of memory is required.

Also, there are demands that when an error occurs with a digital video signal, the error should be detected within a short time.

DISCLOSURE OF INVENTION

The present invention has been made in view of these problems, and the object is to provide a video analyzer suitable for delaying an encoded video signal, and a video error detector suitable for detecting a video error from an encoded video signal.

The present invention is a video analyzer for analyzing an encoded video signal conforming to the MPEG (Moving Picture Experts Group) standard. The analyzer includes:

an input for inputting the encoded video signal;
an extracting part for extracting the encoded information;
an analyzing part for analyzing the extracted encoded information;
a decoding part for decoding the input encoded video signal;
a delaying part for delaying transmission of the encoded video signal to the decoding part based on analysis processing time of the encoded video signal; and
a multiplexing part for multiplexing the analyzed encoded information and the decoded video signal.

In a video analyzer according to the present invention, the analyzing part may further include a plurality of analyzing units which allows analyzing in parallel and a plurality of memories which allows buffering encoded video signals for one picture corresponding to the plurality of analyzing units, and the delaying part may count, (using processing time in the encoded information analyzing part as a reference time), the number of packets arriving within the reference time period, and may delay the number of the packets corresponding to the reference time.

In a video analyzer according to the present invention, the calculation part may further count the number of slices in one picture, and may specify one slice or more for performing analysis process so that the analysis process is finished within a time period of displaying the same number of pictures as analyzing units.

In a video analyzer according to the present invention, the calculation part may calculate the data amount of one picture or divided data thereof of the encoded video signal, may input the data amount into the analyzing part, and may determine an error occurrence when the analyzing part has processed the encoded video signal of the amount greater than the data amount calculated in the calculation part.

In a video analyzer according to the present invention, the calculation part may detect a picture-start code included in the encoded video signal; if a sequence-header code or a GOP-header code is not detected between picture-start codes, the calculation part may count a data amount from the preceding picture-start code to immediately before the next picture-start code; if a sequence-header code or a GOP-header code is detected, the calculation part may count a data amount from the picture-start code to immediately before the sequence-header code or the GOP-header code; and for divided data, the calculation part may count a data amount from a first detected slice-start code in a specified slice to immediately before the slice-start code detected next to the last detected slice-start code, immediately before the picture-header code, immediately before the GOP-header code, or immediately before the sequence-header code.

A video error detector according to the present invention is a video error detector for processing encoded information included in an encoded video signal conforming to the MPEG (Moving Picture Experts Group) standard, the detector including:

an input part for inputting the encoded video signal;
an extracting part for extracting the encoded information; and
an analyzing part for analyzing the extracted encoded information;

wherein the analyzing part specifies data from a picture-start code to immediately before the next picture-start code, data from a picture-start code to immediately before a GOP-header code, or data from a picture-start code to immediately before a sequence-header code for one picture data, and pick out a slice-start code therefrom, compares the slice number thereof with a slice number which has already been detected in the picture, and determines an error occurrence when a smaller number than the current slice number is detected.

In a video error detector according to the present invention, an error may be detected by extracting a slice-start code in one picture (or divided data thereof) of the encoded video signal and detecting an omission of a slice number.

In a video error detector according to the present invention, the analyzing part may detect an error by counting the number of macro blocks of the encoded video signal for each slice number and comparing the number with a predetermined value.

In a video error detector according to the present invention, the encoded information extracting part may extract and input, from a transport stream, picture data to be input into the analyzing part and a presentation time stamp of the picture thereof; the analyzing part may sort the analysis data in order of time of the presentation time stamp using the presentation time stamp; and the analyzing part may determine a video error occurrence if the time difference between the presentation time stamps of the preceding and the succeeding pictures is equal to or greater than a certain threshold value.

Furthermore, the video error detector is for processing encoded information included in an encoded video signal conforming to the MPEG (Moving Picture Experts Group) standard, the detector including:

an input part for inputting an encoded video signal;

an extracting part for extracting encoded information;

an analyzing part for analyzing the extracted encoded information; and a calculation part for calculating one picture or divided data thereof of the input encoded video signal, wherein when the analyzing part has processed the encoded information of the amount greater than the data amount calculated in the calculation part, the analyzing part informs an error occurrence.

Moreover, in the video error detector, the calculation part may further detect a picture-start code included in the encoded video signal; if a sequence-header code or a GOP-header code is not detected between picture-start codes, the calculation part may count a data amount from the preceding picture-start code to immediately before the next picture-start code; if a sequence-header code or a GOP-header code is detected, the calculation part may count a data amount from the picture-start code to immediately before the sequence-header code or the GOP-header code.

Furthermore, in the video error detector, the analyzing part may further detect an error by counting the number of macro blocks of the encoded video signal for each slice number and comparing the number with a predetermined value.

Moreover, in the video error detector, the analyzing part may further detect an error by extracting slice numbers in the encoded video signal and detecting an omission of a slice number.

According to the present invention, the analysis processing time of the analyzing part does not exceed a certain time period, and thus the delay amount of the encoded video signal can be set without obtaining the transport rate. Also, according to the present invention, it is possible to provide a video error detector which can suitably detect an error of a video from an encoded video signal.

BEST MODE FOR CARRYING OUT THE INVENTION

Figure 1:
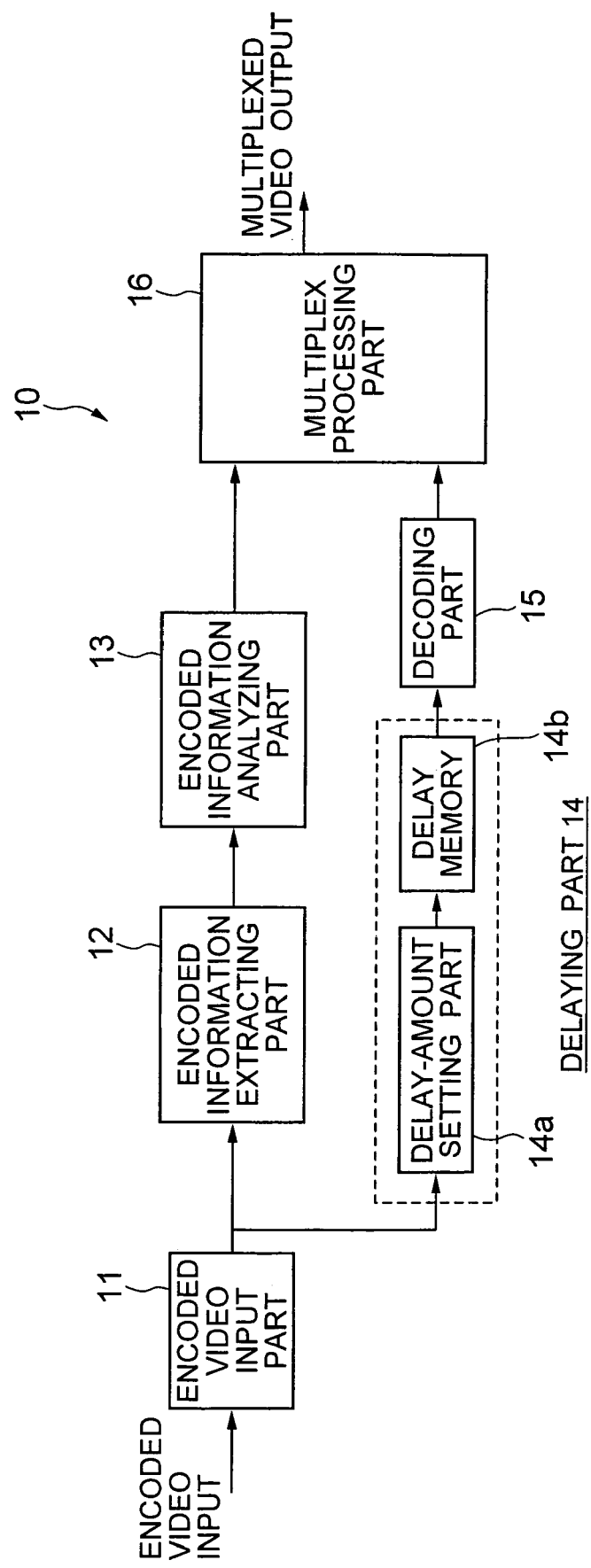
FIG. 1 is a block diagram illustrating a video analyzer 10 according to a first embodiment.

In the following, a description will be given of the present invention with reference to embodiments. FIG. 1 is a block diagram illustrating a video processor 10 according to the present embodiment. In FIG. 1, an encoded video signal (specifically, a signal which is produced by compression encoding a digital video signal by MPEG-2 and formed into a transport stream) is input into an encoded video input part 11, and the encoded video input part 11 performs synchronous detection of a transport stream. The encoded video signal, which is output from the encoded video input part 11, is divided into two signals, one is input into an encoded information extracting part 12, and the other is input into a delaying part 14.

Figure 3:
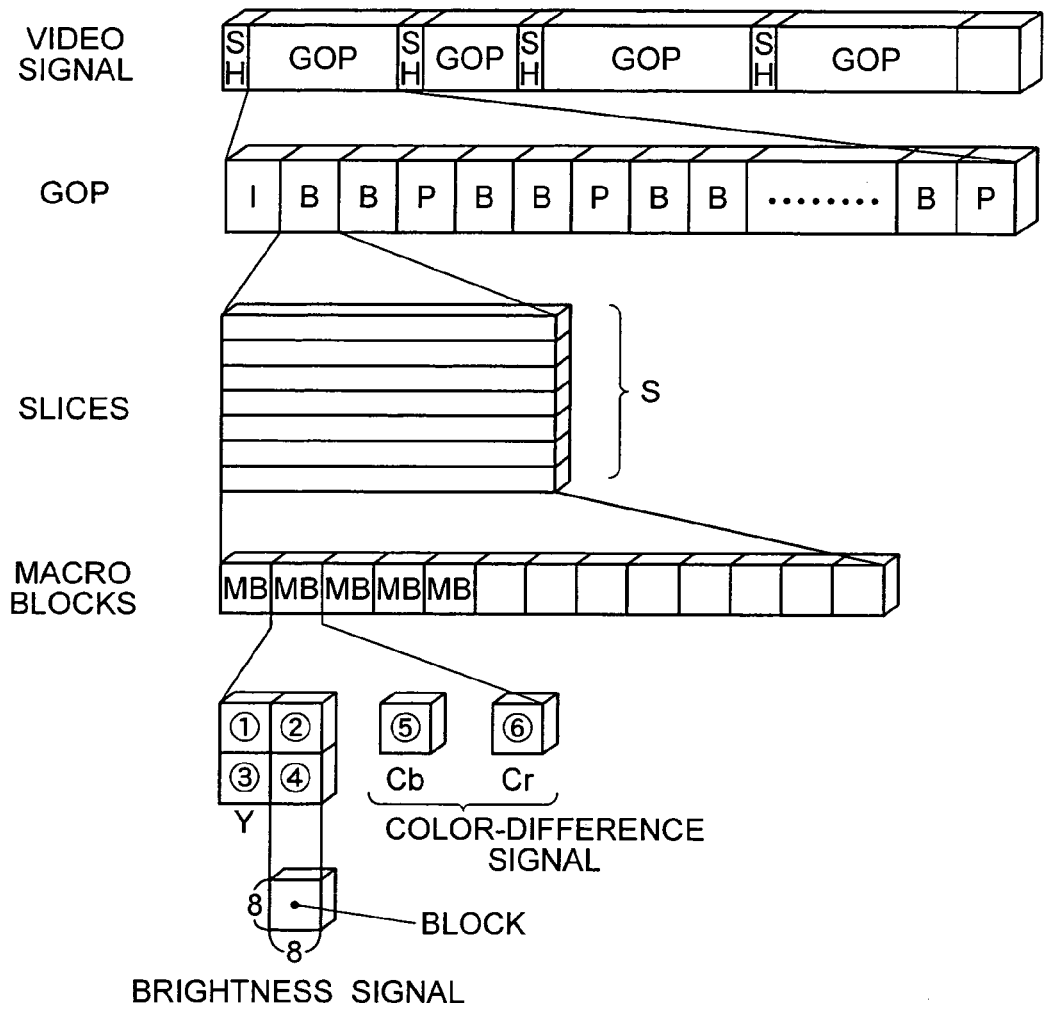
FIG. 3 is a diagram schematically illustrating the structure of an encoded video signal.

FIG. 3 schematically illustrates the structure of the encoded video signal. The encoded video signal has a structure in which a sequence header SH including control information and a group of pictures GOP including video information are interchangeably connected. The GOP includes at least one I picture, and further B pictures and P pictures. Taking the I picture for example, one picture includes a plurality of slices S (for example, 68 pieces in the case of high-definition video). The slice S is one piece of data produced by dividing video signals for one picture in a lateral direction of the one picture. One slice S includes a plurality of macro blocks MB. When the sampling format of a brightness signal and a color-difference signal is 4:2:0, one macro block MB includes a brightness signal Y having 16×16 pixels and each one of color-difference signals Cb and Cr each having 8×8 pixels.

The encoded information extracting part 12 extracts encoded information (parameters) necessary for analyzing video characteristic from the encoded video signal. Specifically, the encoded information extracting part 12 extracts the sequence header, a GOP header, and a picture header. Furthermore, an encoded information analyzing part 13 decodes macro blocks based on the extracted header information, extracts Q-Scales and motion vectors, and outputs them to a multiplex processing part 16.

At the same time, a delay-amount setting part 14a of a delaying part 14 counts the number of packets in a transport stream, which is input during a predetermined set time, and buffers it into a delay memory 14b. After the elapse of this time, the delaying part 14 outputs the encoded video signal. A decoding part 15, to which this signal has been input, decodes the encoded video signal, and outputs it to the multiplex processing part 16.

The multiplex processing part 16 multiplexes and displays the information based on the analysis result from the encoded information analyzing part 13 and the video of the digital video signal from the decoding part 15. For example, if motion vectors are represented by arrows, and are multiplexed with a digital video, the observer observing such a video can grasp the characteristic of the video at a glance while viewing the video being played back in real time.

According to the present embodiment, since the delaying part 14 delays transmission of a video signal, the timing at which a decoded digital video signal is input into the multiplex processing part 16 matches the timing at which the analysis result from the encoded information analyzing part 13 is received by the multiplex processing part 16. It is, therefore, possible to synchronize the video and the analysis data, and to show the analysis result on the same screen, and thus a large capacity memory is unnecessary.

Figure 2:
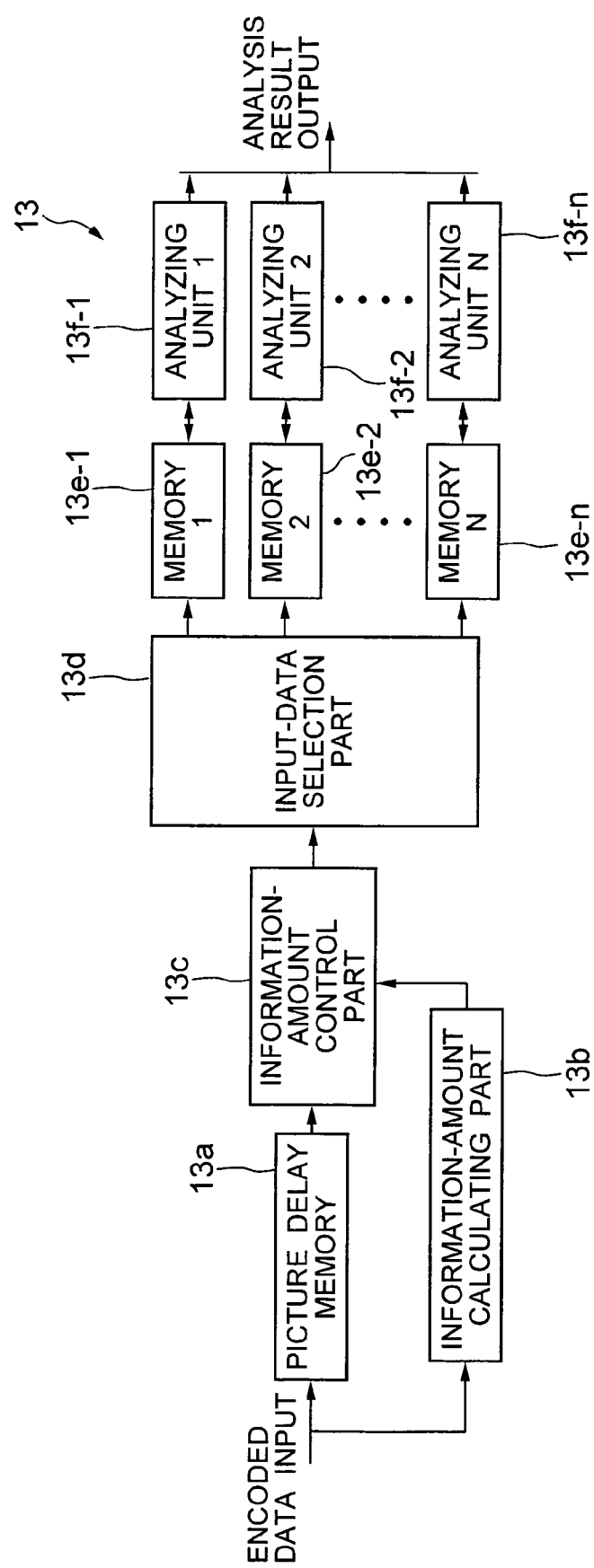
FIG. 2 is a block diagram of encoded information analyzing part 13.

FIG. 2 is a block diagram of an encoded information analyzing part 13. The encoded video signal from the encoded information extracting part 12 shown in FIG. 1 is delayed for one picture in a picture delay memory 13*a* of the encoded information analyzing part 13. The delay time corresponds to the time period for calculating the amount of information generated for one picture. Also, a calculation part 13*b* counts the number of slices in one picture, and specifies the number of slices, (which is one or more), on which the analyzing processing is performed, such that the analyzing-processing is completed within a time period of displaying the picture for the number of analyzing units.

In FIG. 2, an input-data selection part 13*d* buffers the picture data of the number of slices specified in an information control part 13*c* into any one of n pieces of memories 13*e*-1 to 13*e*-*n*. The encoded video signals for one picture buffered in the memories 13*e*-1 to 13*e*-*n* are decoded in analyzing units 13*f*-1 to 13*f*-*n*, respectively, and the analysis result is output to the multiplex processing part 16 in FIG. 1.

According to the present embodiment, the analysis time of a video is not greater than a certain time period, and thus the picture display time for the number of analyzing units may be set in the delay-amount setting part 14*a* in FIG. 1.

Figure 4:
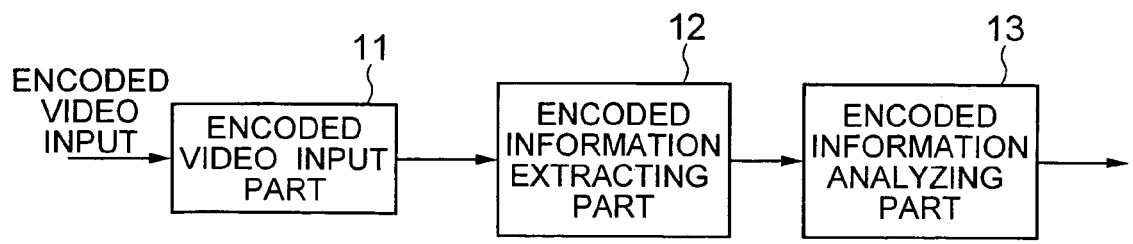
FIG. 4 is a block diagram illustrating a video error detector 10' according to a second embodiment.

FIG. 4 is a block diagram illustrating a video error detector 10' according to another embodiment. The present embodiment is different from the video analyzer 10 shown in FIG. 1 only in the point that the delaying part 14 and the multiplex processing part 16 are removed. The information-amount calculation part 13*b* in FIG. 2 detects the picture-start codes which are located at the beginning of the I, P, and B pictures in FIG. 3. If a sequence-header code or a GOP-header code located at the beginning of a GOP is not detected, the information-amount calculation part 13*b* counts the amount of the data from the preceding picture-start code to immediately before the next picture-start code. Also, if the sequence-header code or the GOP-header code is detected, the information-amount calculation part 13*b* counts the amount of the data from the picture-start code to the sequence-header code, the GOP-header code, or immediately before the GOP-header code, and inputs the amount of information into the information control part 13*c*. The amount of data is stored into any one of the memories 13*e*-1 to 13*e*-*n* together with the picture data stored in the picture delay memory 13*a* through the input-data selection part 13*d*.

In this regard, for divided data specifying one slice or more on which analysis processing is performed, the information-amount calculation part 13*b* counts the amount of the data from the first detected slice-start code among the specified slices to immediately before the slice-start code detected next to the last detected slice-start code, or immediately before a picture-header code, or immediately before a GOP-header code, or immediately before a sequence-header code, and inputs it into the information control part 13*c*.

In the analyzing units, picture data is input from the memory, and the decoding processing is performed. If picture data has an error, and omits a slice header, in the decoding process, picture data is read from the memory until the next slice header is detected. Here, the amount of data of the picture and the amount of data read from the memory is compared. If the amount of data exceeds the amount of data of the picture read from the memory, an occurrence of an error is detected, and an alarm signal is output to an alarm output part, (not shown in the figure). Also, the information-amount calculation part 13*b* counts the slice numbers, and outputs an alarm if there is an omission of a slice number.

Also, the information-amount calculation part 13*b* extracts a slice-start code from the data of one picture, and compares the slice number with the slice number already detected in that picture. If a smaller number than the current slice number is detected, an occurrence of an error is detected, and an alarm is output. Here, one picture data represents: the data from a picture-start code to immediately before the next picture-start code, the data from a picture-start code to immediately before a GOP-header code, or the data from a picture-start code to immediately before a sequence-header code.

In the encoded information extracting part 12 in FIG. 4, together with the picture data to be input to the encoded information analyzing part 13, the presentation time stamp of the picture thereof is extracted from the transport stream and is input to the encoded information analyzing part 13. In the encoded information analyzing part 13, the analysis data is sorted in order of time of the presentation time stamp using that presentation time stamp. If the time difference of the presentation time stamps between the preceding and the succeeding pictures is equal to or greater than a certain threshold value, it is determined that a video error has occurred, and an alarm is output.

This threshold value is obtained from the frame rate code of the sequence header. For example, if the frame code is 4, the frame rate value becomes (30000÷1001). The time difference of the frame is the reciprocal thereof, and thus becomes (1001÷30000). The threshold value can be obtained by adding a certain constant of an accidental error to this value. In this regard, in the configuration of FIG. 1, in the multiplex processing part 16, the analysis data is sorted, and a time interval of the presentation time stamps is determined.

In the analyzing units 13*f*-1 to 13*f*-*n*, the number of decoded macro blocks is counted when decoding a slice. Here a plurality of slice numbers may exist, the number of macro blocks is accumulated for each slice number. The accumulated number of macro blocks and the number of macro blocks calculated from the parameters of the sequence header are compared. If both of the numbers are not equal, it is determined that an error has occurred, and an alarm is output. In this regard, if a sequence header is omitted, the comparison is made of the accumulated value of the number of slices in which an error does not occur during decoding.

According to the present embodiment, by calculating the amount of the data of the picture, it is possible to prevent the decoding processing from running out of control, and to detect an error. Also, by counting the slice numbers, an error can be detected without performing the decoding process. Furthermore, by counting the number of macro blocks for each slice number, an error detection can be promptly performed.

The present video error detector can be achieved by software in addition to hardware. In this case, the encoded video input part 11 in FIG. 4 is connected to a computer, and the encoded information extracting part 12 and the encoded information analyzing part 13 can be replaced with software which runs on the computer.

Figure 5:
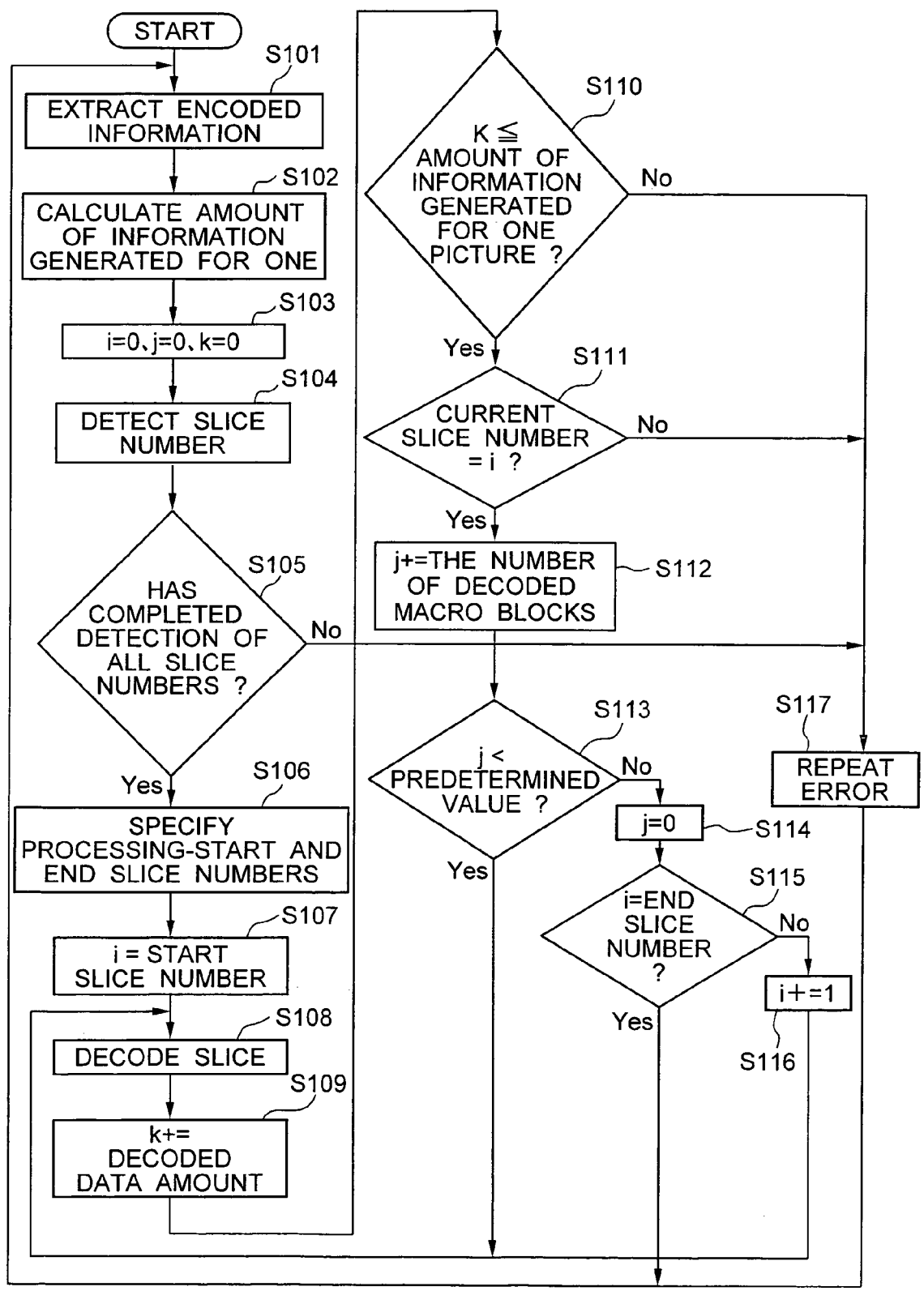
FIG. 5 is a flowchart of the case where the operation of the video error detector is performed by software.

FIG. 5 is a flowchart of the encoded information extracting part 12 and the encoded information analyzing part 13 as a video error detector using software. In step S101, a computer which runs in accordance with software (in the following, referred to as a computer) extracts encoded information from the encoded video signal. In step S102, an amount of information generated for one picture is calculated. In step S103, initialization such that i=0, j=0, and k=0, is performed. In step S104, the slice number is detected. In the subsequent step S105, if all of the slice numbers are not detected, the computer determines that an error has occurred, and thus the processing goes to step S117, informs the error, and then the flow is returned to step S101.

At the same time, if all of the slice numbers are detected in step S105, the computer performs analysis processing in step S106, and specifies the slice number. In step S107, the computer makes a replacement: i=start slice number. In step S108, the computer decodes the slices. In step S109, k+=the amount of decoded data. In step S110, k and the amount of information generated for one picture are compared. Here, if k is determined to be greater than the amount of information generated for one picture, the computer determines that an error has occurred, goes to step S117, reports the error, and then returns the flow to step S101.

At the same time, in step S110, if k is determined to be equal or less than the amount of information generated for one picture, the computer compares the current slice number with i in step S111. If it is determined that it is not equal to i, the computer reports the error, and then returns the flow to step S101.

On the other hand, in step S111, if the current slice number is determined to be equal to i, in step S112, the computer performs an assignment: j+=the number of decoded macro blocks. In step S113, j is compared with a predetermined value. Here, if j is determined to be smaller than a predetermined value, the computer repeats the operations from step S108. At the same time, if j is determined to be equal to or greater than a predetermined value, the computer performs an assignment: j=0 in step S114. In step S115, if i is not equal to the last slice number, the computer adds 1 to i in step S116, and then repeats the operations from step S108. On the other hand, in step S115, if it is determined that i=the last slice number, the computer returns the flow to step S101.

The invention claimed is:

1. A video analyzer for analyzing encoded information included in an encoded video signal conforming to the MPEG (Moving Picture Experts Group) standard, the analyzer comprising:
   an input part for inputting the encoded video signal;
   an extracting part for extracting the encoded information;
       an analyzing part for analyzing the extracted encoded information;
   a decoding part for decoding the input encoded video signal;
   a delaying part for delaying transmission of the encoded video signal to the decoding part based on analysis processing time of the encoded video signal; and
   a multiplexing part for multiplexing the analyzed encoded information and the decoded video signal,
       wherein the analyzing part comprises a plurality of analyzing units which allows analyzing in parallel and a plurality of memories which allows buffering encoded video signals for one picture corresponding to the plurality of analyzing units, and the delaying part counts, using processing time in the encoded information analyzing part as a reference time, the number of packets arriving within the reference time period, and delays only the number of the packets corresponding to the reference time.

2. The video analyzer according to claim 1, wherein the calculation part counts the number of slices in one picture, and specifies one slice or more for performing analysis processing so that the analysis processing is completed within a time period of displaying the number of pictures for the number of analyzing units.

3. The video analyzer according to claim 1, wherein the calculation part calculates data amount of one picture or divided data thereof the encoded video signal, inputs the data amount into the analyzing part, and determines an error occurrence when the analyzing part has processed the encoded information of the amount greater than the data amount calculated in the calculation part.

4. The video analyzer according to claim 3, wherein the calculation part detects a picture-start code included in the encoded video signal; if a sequence-header code or a GOP-header code is not detected between picture-start codes, the calculation part counts a data amount from the preceding picture-start code to immediately before the next picture-start code; if a sequence-header code or a GOP-header code is detected, the calculation part counts a data amount from the picture-start code to immediately before the sequence-header code or the GOP-header code; and for divided data, the calculation part counts a data amount from a first detected slice-start code in a specified slice to the immediately before the slice-start code detected next to the last detected slice-start code, immediately before the picture-header code, immediately before the GOP-header code, or immediately before the sequence-header code.

5. A video error detector for processing encoded information included in an encoded video signal conforming to the MPEG (Moving Picture Experts Group) standard, the detector comprising:
   an input part for inputting the encoded video signal;
   an extracting part for extracting the encoded information; and
   an analyzing part for analyzing the extracted encoded information;
   wherein the analyzing part specifies data from a picture-start code to immediately before the next picture-start code, data from a picture-start code to immediately before a GOP-header code, or data from a picture-start code to immediately before a sequence-header code for one picture data, extracts a slice-start code therefrom, compares the slice number thereof with a slice number which has already been detected in the picture, and determines an error occurrence when a smaller number than the current slice number is detected, and
   wherein the encoded information extracting part extracts and inputs, from a transport stream, picture data to be input into the analyzing part and a presentation time stamp of the picture thereof; the analyzing part sorts the analysis data in order of time of the presentation time stamp using the presentation time stamp; and the analyzing part determines a video error occurrence if a time difference between the presentation time stamps of the preceding and the succeeding pictures is equal to or greater than a certain threshold value.

6. The video error detector according to claim 5 wherein the analyzing part detects an error by counting the number of macro blocks of the encoded video signal for each slice number and comparing the number with a predetermined value.

7. The video error detector according to claim 5, wherein an error is detected by extracting a slice-start code in the one picture or divided data thereof of the encoded video signal and detecting an omission of a slice number.

8. The video analyzer according to claim 1, wherein the calculation part calculates data amount of one picture or divided data thereof the encoded video signal, inputs the data amount into the analyzing part, and determines an error occurrence when the analyzing part has processed the encoded information of the amount greater than the data amount calculated in the calculation part.

9. The video analyzer according to claim 2, wherein the calculation part calculates data amount of one picture or divided data thereof the encoded video signal, inputs the data amount into the analyzing part, and determines an error occurrence when the analyzing part has processed the encoded information of the amount greater than the data amount calculated in the calculation part.

10. A video error detector for processing encoded information included in an encoded video signal conforming to the MPEG (Moving Picture Experts Group) standard, the detector comprising:

an input part for inputting the encoded video signal;

an extracting part for extracting the encoded information; and an analyzing part for analyzing the extracted encoded information;

wherein the analyzing part specifies data from a picture-start code to immediately before the next picture-start code, data from a picture-start code to immediately before a GOP-header code, or data from a picture-start code to immediately before a sequence-header code for one picture data, extracts a slice-start code therefrom, compares the slice number thereof with a slice number which has already been detected in the picture, and determines an error occurrence when a smaller number than the current slice number is detected, wherein an error is detected by extracting a slice-start code in the one picture or divided data thereof of the encoded video signal and detecting an omission of a slice number, and wherein the encoded information extracting part extracts and inputs, from a transport stream, picture data to be input into the analyzing part and a presentation time stamp of the picture thereof; the analyzing part sods the analysis data in order of time of the presentation time stamp using the presentation time stamp; and the analyzing part determines a video error occurrence if a time difference between the presentation time stamps of the preceding and the succeeding pictures is equal to or greater than a certain threshold value.

11. The video error detector according claim 6, wherein the encoded information extracting part extracts and inputs, from a transport stream, picture data to be input into the analyzing part and a presentation time stamp of the picture thereof, the analyzing part sorts the analysis data in order of time of the presentation time stamp using the presentation time stamp; and the analyzing part determines a video error occurrence if a time difference between the presentation time stamps of the preceding and the succeeding pictures is equal to or greater than a certain threshold value.

* * * * *